W. GATES.
LAND-ROLLER.

No. 187,121. Patented Feb. 6, 1877.

Witnesses:
P. C. Dieterich
Frank H. Duffy

Inventor:
William Gates
Per: C. H. Watson & Co. Attorneys

N. PETERS, PHOTO-LITHOGRAPHER, WASHINGTON, D. C.

UNITED STATES PATENT OFFICE.

WILLIAM GATES, OF HOPKINS' STATION, MICHIGAN.

IMPROVEMENT IN LAND-ROLLERS.

Specification forming part of Letters Patent No. 187,121, dated February 6, 1877; application filed December 16, 1876.

*To all whom it may concern:*

Be it known that I, WILLIAM GATES, of Hopkins' Station, in the county of Allegan and State of Michigan, have invented certain new and useful Improvements in Land-Roller; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction and arrangement of a land-roller, as will be hereinafter more fully set forth.

Figure 1:
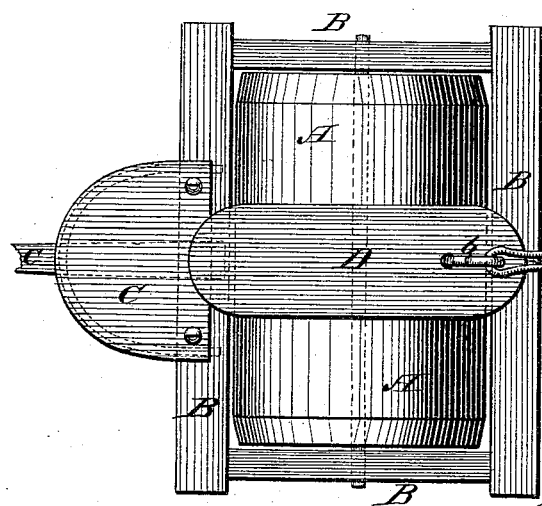
Figure 1:
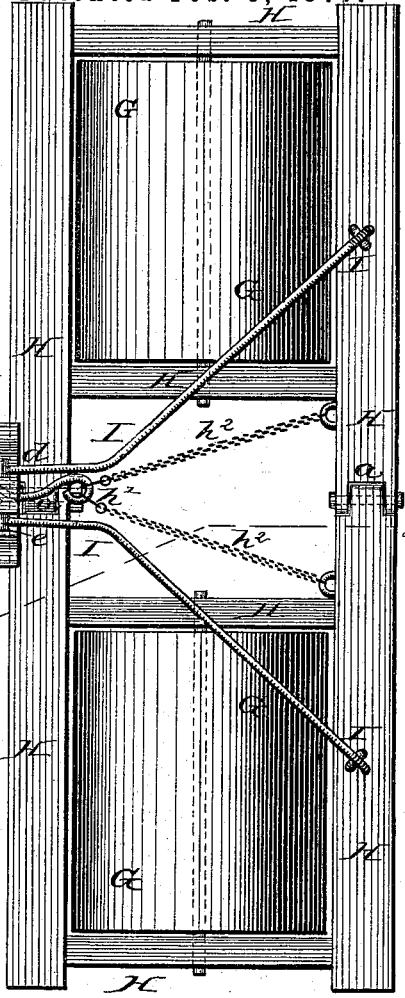
Figure 2:
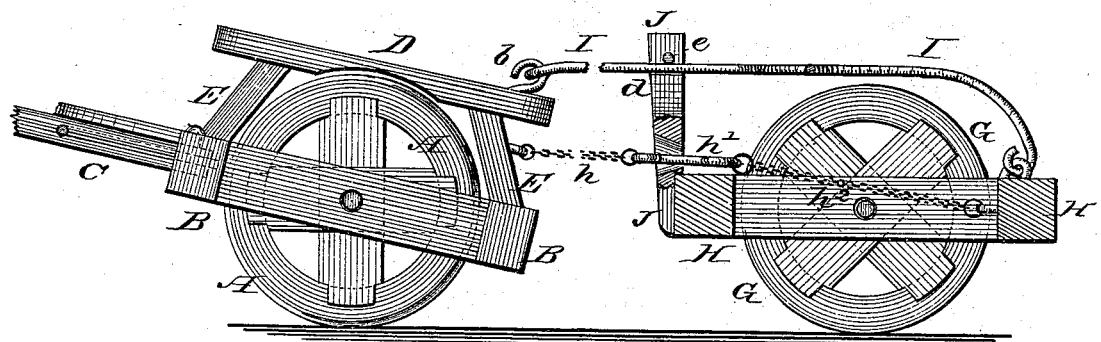

In the annexed drawing, Figure 1 is a plan view of my land-roller, and Fig. 2 is a section of the same through the line $x\,x$, Fig. 1.

A represents the front roller, mounted in a frame, B, to which the tongue C is attached. The driver's seat D is arranged crosswise over the center of the roller A, and is supported from the roller-frame B by suitable end pieces E E, as shown in Fig. 2.

G G represent the rear rollers, which are mounted in frames H H, connected together by knuckle-joints at $a\,a$, so that the rollers G G can accommodate themselves to uneven ground.

The front and rear roller-frames are connected by means of a rod, I, bent in the center to receive a hook, $b$, at the rear end of the seat D. The two arms of the rod pass rearward over shoulders $d\,d$ and under pins $e\,e$ at the upper end of a standard, J, which is attached to the front of the frames H at the joint thereof. At the rear of the standard J the ends of the rod I diverge, and their extreme ends are connected to the rear bars of the frames H, in the centers thereof. This bent rod I forms a high reach, which will allow the front roller to turn square around, as required.

To the rear seat-support E is attached a chain, $h$, which, by a hook, $h^1$, is connected to two chains, $h^2\,h^2$, and these latter chains are connected to the rear portions of the frames H near the knuckle-joint, as seen in Fig. 1. The hook $h'$ passes through a hole made for that purpose in the standard J. By means of these chains forming an additional connection between the front and rear roller-frames, it will be seen that when either the front or rear roller is in a hollow, the draft will be directly on these chains, thus taking off the strain from the reach.

Having thus fully described my invention, what I claim as new, and desire to secure by Letters Patent, is—

In a land-roller, the frame and rollers, in combination with the high reach I, and the chains $h\,h^2$, connected substantially as and for the purpose herein set forth.

In testimony that I claim the foregoing as my own I affix my signature in presence of two witnesses.

WILLIAM GATES.

Witnesses:
EMMA HOLDSWORTH,
JAMES HOLDSWORTH.